United States Patent [19]
Farrington

[11] 3,955,835
[45] May 11, 1976

[54] GAS ECONOMIZER

[76] Inventor: Percy L. Farrington, 2410 Lincoln Manor Drive, Flint, Mich. 48507

[22] Filed: Feb. 21, 1975

[21] Appl. No.: 551,732

[52] U.S. Cl.................................. 285/175; 138/37; 285/332; 285/386
[51] Int. Cl.² ......................................... F16L 25/00
[58] Field of Search................. 285/332.1, 354, 386, 285/332, 175; 138/45, 37, 46; 48/180 R; 254/4

[56] References Cited
UNITED STATES PATENTS

| | | | |
|---|---|---|---|
| 640,197 | 1/1900 | Hewlett | 285/332 X |
| 1,270,015 | 6/1918 | Couch | 138/37 X |
| 1,279,771 | 9/1918 | Snider | 138/37 X |
| 1,515,617 | 11/1924 | Reynolds et al. | 138/37 |
| 1,608,547 | 11/1926 | Clark | 48/180 R |

Primary Examiner—Dave W. Arola
Attorney, Agent, or Firm—Victor J. Evans & Co.

[57] ABSTRACT

A gas economizer which comprises a union for insertion in a gas line leading to a gas appliance with the male portion of the union provided with a plurality of spirally extending fins to cause a swirling action in the gas passing therethrough.

2 Claims, 4 Drawing Figures

U.S. Patent May 11, 1976 3,955,835
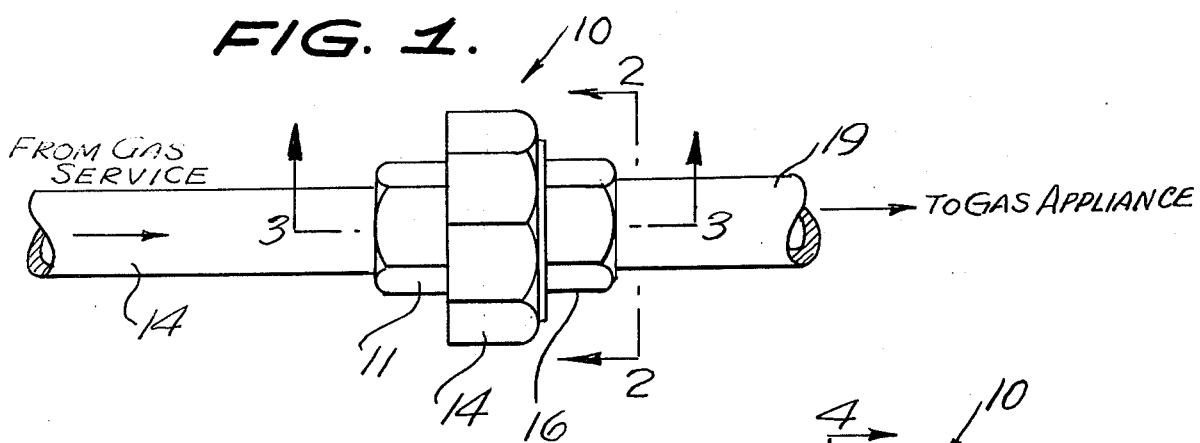
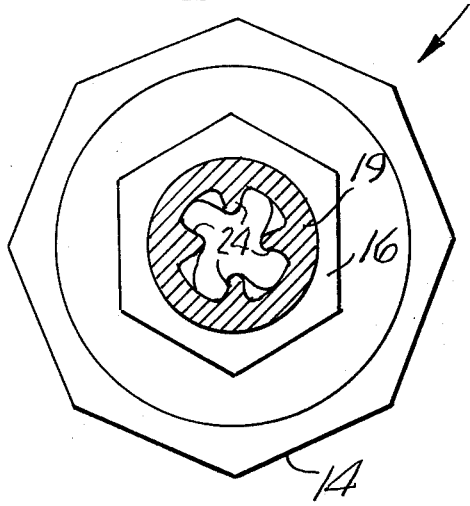
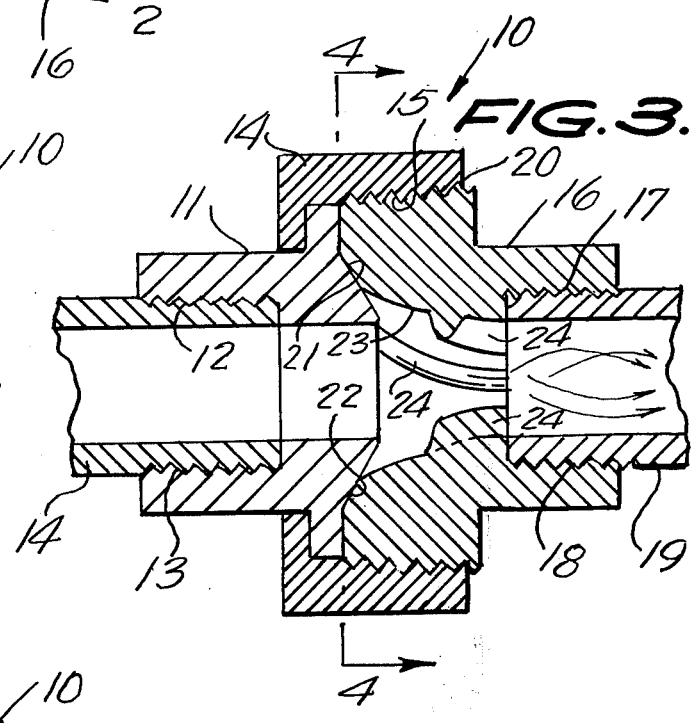
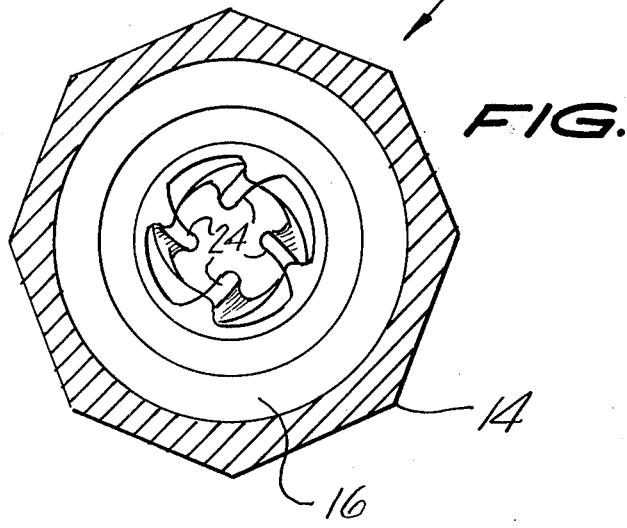

GAS ECONOMIZER

BACKGROUND OF THE INVENTION

1. Field of the Invention

The present invention relates to devices for insertion in a gas line to cause a swirling action in the gas passing therethrough.

2. Summary of the Invention

The present invention is directed to a gas economizer formed in the male section of a pipe union and providing a plurality of spirally extending internal fins in the male portion of the union to produce a swirling action in the gas passing therethrough.

The primary object of the invention is to provide a simple structure for insertion in the gas service line to produce a swirling action in the gas passing therethrough.

Other objects and advantages will become apparent in the following specification when considered in light of the attached drawings.

BRIEF DESCRIPTION OF THE DRAWINGS

FIG. 1 is a side elevation of the invention;

FIG. 2 is an enlarged fragmentary vertical sectional view taken along the line 2—2 of FIG. 1, looking in the direction of the arrows;

FIG. 3 is an enlarged longitudinal sectional view taken along the line 3—3 of FIG. 1, looking in the direction of the arrows; and FIG. 4 is a transverse sectional view taken along the line 4—4 of FIG. 3, looking in the direction of the arrows.

DESCRIPTION OF THE PREFERRED EMBODIMENT

Referring now to the drawings in detail wherein like reference characters indicate like parts throughout the several figures the reference numeral 10 indicates generally a gas economizer constructed in accordance with the invention.

The gas economizer 10 includes a female union member 11 having internal threads 12 for threading onto thread 13 of a gas pipe 14. A coupling member 14 is swivelly mounted on the member 11 and includes internal threads 15 as can be seen in FIG. 3. A male union member 16 is provided with internal threads 17 for threading onto threads 18 of gas pipe 19 as can be seen in FIG. 3.

The male union member 16 is externally threaded at 20 to permit the coupling member 14 to threadably engage thereover.

The female coupling member 11 has an outwardly projecting conical surface 21 formed thereon and the male union member 16 has a concaved conical surface 22 formed thereon for leak proof engagement with the conical surface 21.

The male union member 16 is provided with a converging opening 23 having a plurality of spiral fins 24 extending radially inwardly of the converging opening 23 as can be best seen in FIGS. 2, 3 and 4. Gas from the gas service pipe 14 passes through the gas economizer 10 in a direction from left to right in FIGS. 1 and 3 so as to pass through the female member 11 and then through the male member 16 so that the gas is caused to pass over the spiral fins 24 to obtain a high speed spiral motion as it passes on through the pipe 19. As the swirling gas reaches the gas appliance the swirling motion of the gas will assist greatly in mixing the gas and air prior to the gas the air being burned in the appliance.

The structure of applicant's invention wherein the spiral fins 24 are formed as part of a pipe union permits the insertion of a gas economizer 10 in a gas flow line with a minimum of difficulty.

Having thus described the preferred embodiment of the invention it should be understood that numerous structural modifications and adaptations may be resorted to without departing from the spirit of the invention.

What is claimed is:

1. A gas economizer for connection to the burner of an appliance comprising a male pipe union member having internal threads at one end thereof for connection to a gas pipe and external threads on the opposite end thereof, a female pipe union member having internal threads at one end for connection to a gas pipe and having a swivel coupling internally threaded mounted on the other end thereof for connection to the externally threaded portion of the male pipe union member, a convexed conical face formed on the end of said female union member having said coupler mounted thereon, a concaved conical face formed on the externally threaded end of said male union member for sealing engagement with the convexed face on said female union member, a converging opening extending through said male union member, and a plurality of spirally extending fins integrally formed on said male union member within said opening and projecting radially inwardly of said opening.

2. A device as claimed in claim 1 wherein said opening in said male union member has a diameter greater than the diameter of the opening in said female union member and converges to a diameter substantially the same as the opening in said female union member to thereby create a high intensity swirling action in the mixture going into the burner of the appliance.

* * * * *